United States Patent
Ford et al.

(10) Patent No.: US 6,862,117 B1
(45) Date of Patent: Mar. 1, 2005

(54) METHOD AND APPARATUS FOR REDUCING THE EFFECT OF BLEED-THROUGH ON CAPTURED IMAGES

(75) Inventors: Gordon D. Ford, Round Rock, TX (US); Leland A. Lester, Austin, TX (US); David C. Iglehart, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 507 days.

(21) Appl. No.: 09/702,546

(22) Filed: Oct. 31, 2000

Related U.S. Application Data

(60) Provisional application No. 60/174,027, filed on Dec. 30, 1999.

(51) Int. Cl.[7] .............................. H04N 1/04; H04N 1/38; H04N 1/40; H01L 27/00
(52) U.S. Cl. ...................... 358/475; 358/474; 358/464; 358/448; 250/208.1
(58) Field of Search .................. 358/475, 474, 358/464, 448; 250/208.1

(56) References Cited

U.S. PATENT DOCUMENTS

| | | | |
|---|---|---|---|
| 4,260,899 A | 4/1981 | Baker ........................ 250/563 |
| 4,301,469 A | 11/1981 | Modeen et al. ............... 358/75 |
| 4,302,108 A | 11/1981 | Timson ...................... 356/359 |
| 4,462,860 A | 7/1984 | Szmanda ................... 156/626 |
| 4,670,779 A | 6/1987 | Nagano ...................... 358/75 |
| 4,677,465 A | 6/1987 | Alkofer ...................... 358/80 |
| 4,680,638 A | 7/1987 | Childs ........................ 358/214 |
| 4,700,229 A | 10/1987 | Herrmann et al. .......... 358/166 |
| 4,775,238 A | 10/1988 | Weber ....................... 356/431 |
| 4,796,061 A | 1/1989 | Ikeda et al. .................. 355/73 |
| 4,845,551 A | 7/1989 | Matsumoto .................. 358/80 |
| 4,933,566 A | 6/1990 | Masaaki et al. ............ 250/563 |
| 4,937,720 A | 6/1990 | Kirchberg .................... 363/41 |
| 4,969,045 A | 11/1990 | Haruki et al. ............... 358/228 |
| 4,972,091 A | 11/1990 | Cielo et al. ................. 250/562 |
| 4,989,973 A | 2/1991 | Noso et al. ................. 356/239 |
| 4,994,918 A | 2/1991 | Lingemann ................. 358/214 |
| 5,003,379 A | 3/1991 | Moore, Jr. et al. ............ 358/54 |
| 5,010,401 A | 4/1991 | Murakami et al. .......... 358/136 |

(List continued on next page.)

FOREIGN PATENT DOCUMENTS

| | | | | |
|---|---|---|---|---|
| DE | 28 21 868 A1 | 11/1979 | .......... G01N/21/32 |
| DE | 196 36 867 C1 | 1/1998 | ............ H04N/5/21 |
| EP | 1 547 811 | 6/1979 | ............ H04N/3/36 |

(List continued on next page.)

OTHER PUBLICATIONS

*New Adaptive Vector Filter Based on Noise Estimate*, Mei Yu, et al., IEICE Trans Fundamentals, vol. E82, No. 6, Jun., 1999.

(List continued on next page.)

*Primary Examiner*—Edward Coles
*Assistant Examiner*—Houshang Safaipour
(74) *Attorney, Agent, or Firm*—Raymond M. Galasso; David A. Novais

(57) ABSTRACT

A method and apparatus are disclosed for reducing the effects of bleed-through on captured images. Multiple images of a single physical medium are recorded by illuminating the physical medium with at least one light source capable of generating light having a first and a second illumination quality. By combining the recorded images, a captured image with reduced bleed-through may be formed. Reflected light, transmitted light, or a combination of reflected and transmitted light from one or more illumination sources may be used in recording the images. The present invention finds application in photocopy devices, facsimile machines, optical recognition systems, and the like.

22 Claims, 4 Drawing Sheets

U.S. PATENT DOCUMENTS

| | | | | |
|---|---|---|---|---|
| 5,047,968 | A | 9/1991 | Carrington et al. | 364/574 |
| 5,058,982 | A | 10/1991 | Katzir | 385/33 |
| 5,091,972 | A | 2/1992 | Kwon et al. | 382/54 |
| 5,097,521 | A | 3/1992 | Massmann | 382/54 |
| 5,149,960 | A | 9/1992 | Dunne et al. | 250/226 |
| 5,155,596 | A | 10/1992 | Kurtz et al. | 358/214 |
| 5,200,817 | A | 4/1993 | Birnbaum | 358/80 |
| 5,266,805 | A | 11/1993 | Edgar | 250/330 |
| 5,267,030 | A | 11/1993 | Giorgianni et al. | 358/527 |
| 5,291,286 | A | 3/1994 | Murakami et al. | 348/469 |
| 5,311,310 | A | 5/1994 | Jozawa et al. | 348/416 |
| 5,335,086 | A | 8/1994 | Kitamura | 358/431 |
| 5,371,542 | A | 12/1994 | Pauli et al. | 348/262 |
| 5,447,811 | A | 9/1995 | Buhr et al. | 430/20 |
| 5,448,380 | A | 9/1995 | Park | 358/520 |
| 5,452,018 | A | 9/1995 | Capitant et al. | 348/651 |
| 5,465,155 | A * | 11/1995 | Edgar | 358/500 |
| 5,465,163 | A | 11/1995 | Yoshihara et al. | 358/444 |
| 5,477,345 | A | 12/1995 | Tse | 358/500 |
| 5,509,086 | A | 4/1996 | Edgar et al. | 382/167 |
| 5,516,608 | A | 5/1996 | Hobbs et al. | 430/30 |
| 5,552,904 | A | 9/1996 | Ryoo et al. | 358/518 |
| 5,561,611 | A | 10/1996 | Avinash | 364/553 |
| 5,565,931 | A | 10/1996 | Girod | 348/675 |
| 5,568,270 | A | 10/1996 | Endo | 358/298 |
| 5,581,376 | A | 12/1996 | Harrington | 358/518 |
| 5,582,961 | A | 12/1996 | Giorgianni et al. | 430/508 |
| 5,583,950 | A | 12/1996 | Prokoski | 382/212 |
| 5,589,887 | A | 12/1996 | Wischermann | 348/616 |
| 5,608,547 | A | 3/1997 | Nakatani et al. | 358/505 |
| 5,641,596 | A | 6/1997 | Gray et al. | 430/21 |
| 5,646,744 | A * | 7/1997 | Knox | 358/401 |
| 5,666,443 | A | 9/1997 | Kumashiro | 382/266 |
| 5,673,336 | A | 9/1997 | Edgar et al. | 382/167 |
| 5,721,624 | A | 2/1998 | Kumashiro et al. | 358/450 |
| 5,726,773 | A | 3/1998 | Mehlo et al. | 358/474 |
| 5,729,631 | A | 3/1998 | Wober et al. | 382/232 |
| 5,771,107 | A | 6/1998 | Fujimoto et al. | 358/464 |
| 5,808,674 | A | 9/1998 | Adams, Jr. et al. | 348/273 |
| 5,892,595 | A | 4/1999 | Yamakawa et al. | 358/530 |
| 5,923,042 | A | 7/1999 | Mietta et al. | 250/559.06 |
| 5,930,388 | A | 7/1999 | Murakami et al. | 382/167 |
| 5,963,662 | A | 10/1999 | Vachtsevanos et al. | 382/150 |
| 5,969,372 | A | 10/1999 | Stavely et al. | 250/559.42 |
| 5,979,011 | A | 11/1999 | Miyawaki et al. | 15/308 |
| 5,982,941 | A | 11/1999 | Loveridge et al. | 382/260 |
| 5,982,951 | A | 11/1999 | Katayama et al. | 382/284 |
| 5,991,444 | A | 11/1999 | Burt et al. | 382/232 |
| 6,005,987 | A | 12/1999 | Nakamura et al. | 382/294 |
| 6,057,040 | A | 5/2000 | Hage | 428/447 |
| 6,075,905 | A | 6/2000 | Herman et al. | 382/284 |
| 6,078,051 | A | 6/2000 | Banton et al. | 250/341.1 |
| 6,078,701 | A | 6/2000 | Hsu et al. | 382/294 |
| 6,101,273 | A | 8/2000 | Matama | 382/169 |
| 6,101,283 | A * | 8/2000 | Knox | 382/254 |
| 6,128,416 | A | 10/2000 | Oura | 382/284 |
| 6,134,343 | A * | 10/2000 | Nichani | 382/141 |
| 6,219,158 | B1 * | 4/2001 | Dawe | 358/509 |
| 6,239,886 | B1 | 5/2001 | Klasser et al. | 358/518 |
| 6,288,798 | B1 * | 9/2001 | Sharma | 358/448 |
| 6,348,980 | B1 * | 2/2002 | Cullen et al. | 358/1.9 |
| 6,437,358 | B1 * | 8/2002 | Potucek et al. | 250/559.45 |
| 6,498,867 | B1 * | 12/2002 | Potucek et al. | 382/274 |

FOREIGN PATENT DOCUMENTS

| | | | |
|---|---|---|---|
| EP | 0 422 220 A1 | 4/1991 | A61B/6/03 |
| EP | 0 482 790 B1 | 4/1992 | H04N/1/40 |
| EP | 0 527 097 A2 | 2/1993 | H04N/1/40 |
| EP | 0 569 142 A1 | 11/1993 | H04N/5/253 |
| EP | 0 624 848 A2 | 11/1994 | G06F/15/68 |
| EP | 0 669 753 A2 | 8/1995 | H04N/1/407 |
| EP | 0 716 538 A2 | 6/1996 | H04N/1/50 |
| EP | 0 751 670 A2 | 1/1997 | H04N/1/10 |
| EP | 0 768 621 A2 | 4/1997 | G06T/5/20 |
| EP | 0 794 454 A2 | 9/1997 | G03B/27/73 |
| EP | 0 816 833 A2 | 1/1998 | G01N/21/88 |
| EP | 0 816 833 A3 | 8/1998 | G01N/21/88 |
| EP | 0 893 914 A2 | 1/1999 | H04N/5/253 |
| GB | 2 283 633 A | 5/1995 | H04N/5/262 |
| JP | 4-291139 | 10/1992 | G01N/21/89 |
| JP | 11185028 | 7/1999 | G06T/1/00 |
| JP | 2000-13604 | 1/2000 | H04N/1/409 |
| JP | 2000-196813 A | 7/2000 | H04N/1/04 |
| WO | WO 98/31142 | 7/1998 | H04N/5/253 |
| WO | WO 98/34397 | 8/1998 | |
| WO | WO 99/40729 | 8/1999 | H04N/9/11 |
| WO | WO 01/48694 | 7/2001 | G06T/5/00 |

OTHER PUBLICATIONS

*A Robust Method for Parameter Estimation of Signal–Dependent Noise Models in Digital Images*, B. Aiazzi, et al., IEEE, 1997, pp. DSP 97—601–604.

*A Regularized Image Restoration Algorithm*, Aggelos K. Katsaggelos, et al., IEEE, 1991, pp. 914–929.

*Adaptive Fourier Threshold Filtering: A Method to Reduce Noise and Incoherent Artifacts in High Resolution Cardiac Images*, M. Doyle, et al., 8306 Magnetic Resonance in Medicine, May, 31, 1994, No. 5, Baltimore, MD., pp. 546–550.

*Anisotropic Spectral Magnitude Estimation Filters for Noise Reduction and Image Enhancement*, Til Aach, et al., IEEE, 1996, pp. 335–338.

*Adaptive–neighborhood filtering of images corrupted by signal–dependent noise*, Rangaraj M. Rangayyan et al., Applied Optics, vol. 37, No. 20, Jul. 10, 1998, pp. 4477–4487.

*Grayscale Characteristics*, Photographic Negatives The Nature of Color Images, Digital Color Management, Giorgianni, et al., Jan. 1998, pp. 163–168.

*Digital Imaging Equipment White Papers*, Putting Damaged Film on Ice, A Technical Discussion of Advances in Digital Imaging, Nikon Corporation, http://www.nikonusa.com/reference/whitepapers/imaging/ditechdisc.html, Aug. 5, 1999.

*Local Cosine Transform—A Method for the Reduction of the Blocking Effect in JPEG*, Gil Aharoni, et al., Journal of Mathematical Imaging and Vision, 3, 7–38, 1993.

*Digital ICE*, Applied Science Fiction, Inc., http://www.asf.com/html/o products/iceprod.html. Aug. 5, 1999.

*About Digital ICE Technology*, Applied Science Fiction, Inc., http://www.asf.com/html/o products/icetech.html. Aug. 5, 1999.

*2–D Adaptive Volterra Filter for 2–D Nonlinear Channel Equalisation and Image Restoration*, J.N. Lin, et al., Electronic Letters, vol. 28, No. 2, Jan. 16, 1992, pp. 180–182.

* cited by examiner

METHOD AND APPARATUS FOR REDUCING THE EFFECT OF BLEED-THROUGH ON CAPTURED IMAGES

CROSS REFERENCE TO RELATED APPLICATIONS

This application claims the benefit of U.S. Provisional Patent Application Ser. No. 60/174,027 filed on Dec. 30, 1999 entitled "Method And Apparatus For Reducing The Effect Of Bleed-Through On Captured Images," of common assignee herewith.

FIELD OF THE INVENTION

The present invention relates generally to image processing, and more particularly to reducing the effects of bleed-through.

BACKGROUND OF THE INVENTION

Document copiers, facsimile machines, optical character recognition systems, and many other modern devices depend on accurately capturing an image formed on a physical medium. Towards that end, scientists and engineers have implemented a great number of improvements in the field of image processing in general, and the acquisition of electronic image representations in particular.

Conventional devices often have difficulty in capturing an image on two sided documents. In particular, when a two sided image is scanned by one of these devices, the image, text, or other mark on the back of the document often "bleeds-through" into the desired image on the front side.

Some devices, such as copiers and facsimile machines, provide a manual adjustment dial to reduce the occurrence of bleed-through. While the manual adjustment can lessen the effects of bleed-through, the adjustment itself can be a source of additional problems. In particular, the manual adjustment is a trial and error process. Using a trial and error adjustment process until acceptable results are obtained is generally time consuming and wasteful. Additionally, using a manual adjustment to attempt to compensate for bleed-through often results in the desired image/text being lightened. When implemented on a facsimile machine, correct manual adjustment can be problematic. For example, a facsimile sender is typically unaware of adjustment problems unless a recipient contacts him and requests that the document be resent. It is clear that a manual adjustment approach to eliminating bleed-through can be wasteful, time consuming, and generally yields less than acceptable results.

SUMMARY OF THE INVENTION

Accordingly, the present invention provides a method for reducing the effects of bleed-through on captured images. In one embodiment, a method for reducing bleed-through comprises illuminating a physical medium with light having a first illumination quality and recording a first image, illuminating the physical medium with light having a second illumination quality and recording a second image, and combining the first and the second image to form a captured image having reduced bleed-through.

Another method according to an embodiment of the present invention obtains information indicative of a first image density of an image formed on a physical medium and a second image density of the same image. The image densities are compared to determine what portions of the information are due to bleed-through. Once the portions of the imaged due to bleed-through are identified, the method alters these portions of the information that are due to bleed-through, thereby forming a corrected image.

In another embodiment of the present invention, an image generated according to one of the methods of the present invention is stored in the fonm of a digital file embodied in a computer readable medium.

The present invention also provides an image-capturing system. In a preferred embodiment, the image-capturing system illuminates a physical medium so that light is reflected by, and transmitted through, the physical medium. The reflected light and the transmitted light reach at least one detector enabled to generate electrical signals in response to incident light, and to output those electrical signals for image processing. Other embodiments include an image-capturing system that uses only reflected light, an image-capturing system that illuminates the physical medium with light having various intensities and/or frequencies, and an image-capturing system comprising a plurality of illumination sources. Yet another embodiment of the present invention is an image-capturing system wherein electrical signals generated by a detector are representative of an image density of an image formed on the physical medium.

An advantage of at least one embodiment of the present invention is reduction of bleed-through on captured images.

Another advantage of the present invention is that the quality of images reproduced from captured images can be greatly improved.

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification.

BRIEF DESCRIPTION OF THE DRAWINGS

In describing the preferred embodiments of the present invention, reference is made to the following figures, wherein like reference numerals designate corresponding parts in the various figures, and wherein.

DETAILED DESCRIPTION OF A PREFERRED EMBODIMENT OF THE INVENTION

In the following detailed description of the preferred embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

The word "light", as used herein, refers to electromagnetic energy, and preferably electromagnetic energy with frequencies generally in the range of $10^{12}$ Hz to $10^{17}$ Hz, and includes visible light as well as portions of the infrared and ultraviolet spectrum. The term "density", as used herein, refers to the amount of light absorbed by an image. For example, a light yellow image absorbs less light than a dark brown image, and is therefore considered less dense. The density of an image affects both the amount of light reflected and the amount of light transmitted through an image. Finally, the term "illumination quality" refers to properties of illumination which include, but are not limited to the following: the intensity of light used to illuminate a physical medium, the predominant frequency of light used to illuminate a physical medium, the spectral composition of light used to illuminate a physical medium, the angle at which light strikes a physical medium, and the like.

Figure 1:
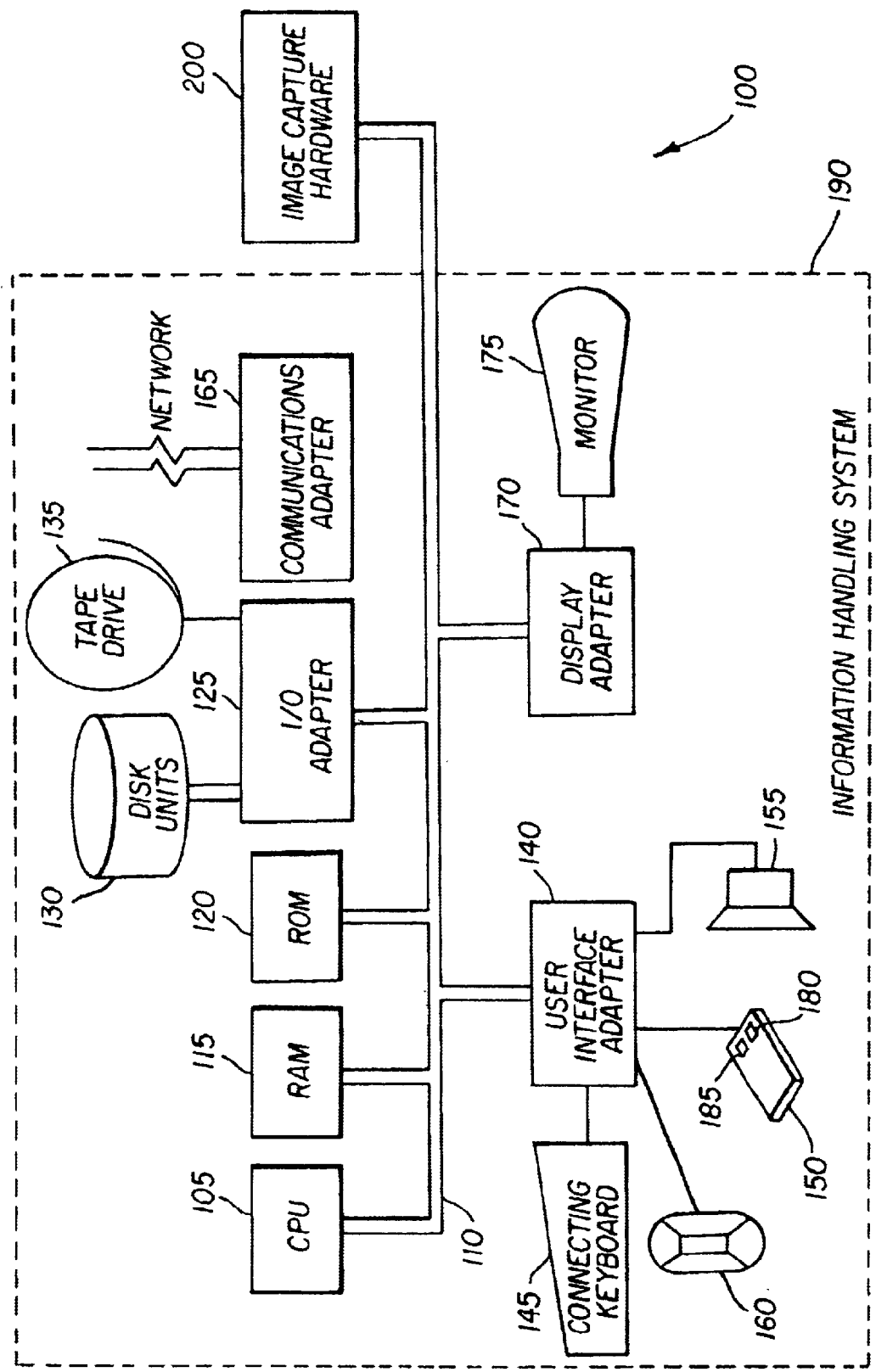
FIG. 1 is a block diagram of an image capturing system according to the present invention.

An image capturing system 100 according to one embodiment of the present invention is depicted in FIG. 1, and is comprised of information handling system 190 and image capture hardware 200. Information handling system 190 preferably comprises a central processing unit 105, such as a conventional microprocessor, and a number of other units interconnected via system bus 110. In one embodiment, information handling system 190 and image capture hardware 200 are separate systems, and are interconnected for functionality. For example, information handling system 190 may be a desktop computer, and image capture hardware 200 may be a flatbed scanner. In this example, the scanner may be configured to depend upon the desktop computer for image processing and control functions. In another embodiment, information handling system 190 and image capture hardware 200 are part of a single physical unit, such as a xerographic reproduction machine, a facsimile machine, an optical character recognition system, a flatbed scanner, etc.

Information handling system 190 shown in FIG. 1 is illustrated as an integral part of image capturing system 100, and includes random access memory (RAM) 115, read-only memory (ROM) 120 wherein the ROM 120 could also be erasable programmable read-only memory (EPROM) or electrically erasable programmable read-only memory (EEPROM), and input/output (I/O) adapter 125 for connecting peripheral devices such as disk units 130 and tape drives 135 to system bus 10, a user interface adapter 140 for connecting keyboard 145, mouse 150, speaker 155, microphone 160, and/or other user interface devices to system bus 110, communications adapter 165 for connecting information handling system 190 to an information network such as the Internet, and display adapter 170 for connecting system bus 10 to a display device such as monitor 175. Mouse 150 has a series of buttons 180, 185 and is used to control a cursor shown on monitor 175. Image capturing system 100 includes both information handling system 190, and image capture hardware 200.

It will be appreciated that some embodiments of the present invention may not include all of the hardware elements listed in the previous paragraphs. For example, the present invention can be implemented on a copier that may not include many of the elements (such as disk units 130, tape drive 135, mouse 150, speaker 155, microphone 160, etc.) that are illustrated in information handling system 190. It is also to be understood that the information handling portion of the present invention is likely to be implemented within an integrated image capturing system, such as a copier, flatbed scanner or facsimile machine, and that the particular configuration and interrelations between subsystems illustrated in FIG. 1 is representative of an embodiment of the present invention that may or may not have substantially the same physical configuration as other embodiments.

Figure 2:
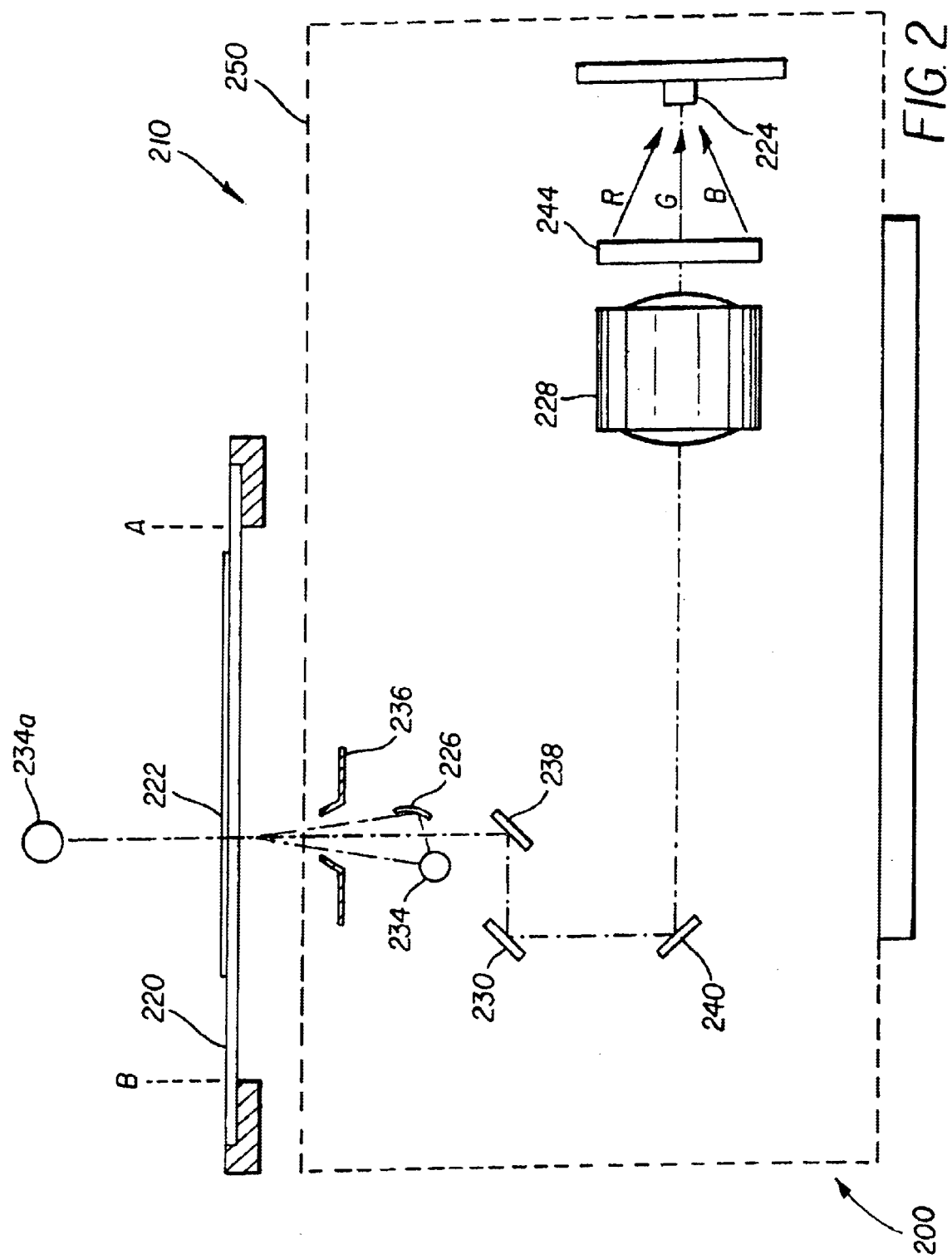
FIG. 2 is a diagram illustrating a preferred embodiment of image capture hardware according to the present invention.

Referring next to FIG. 2, image capture hardware 200 is illustrated according to one embodiment of the present invention. Image capture hardware 200 incorporates a transparent platen 220 on which a document having an image 222 to be copied is located. In one implementation, one or more photosensitive arrays 224 are supported for reciprocating scanning movement below platen 220. In yet another implementation, additional photosensitive arrays (not shown for ease of illustration) may be positioned above and below platen 220, and may or may not be configured to move along with platen 220. A scanning system assembly 250 includes several optical components which move together as a single unit. The scanning system assembly 250 typically includes a lamp 234, an associated reflector 226 and a baffle 236, with the latter two elements cooperating to direct a narrow band of light onto a small area across the platen 220. Also included in the assembly are lens 228, and mirrors 30, 38, and 40, which operate together to focus the light band onto the platen 220 and the document being scanned thereon, through color sensor 244, where light from the light band is filtered into separate color sources, and onto array 224. Array 224 produces electrical image signals representative of image 222. These signals may be output other devices for further processing.

Illumination source 234a is also included with scanning assembly 250. Illumination source 234a is used in a similar manner to lamp 234, except that illumination source 234a is positioned to illuminate the back of the document containing image 222. By illuminating the back of the document, illumination source 234a provides a source of transmitted light that can be used in accordance with the principles of the present invention to enhance the quality of a captured image. As previously mentioned, additional photosensitive arrays (not shown) may be positioned above platen 220 to receive light transmitted through the document containing image 222. Various arrangements of illumination sources and detectors that permit measurements to be made using reflected light, transmitted light, or both, can be implemented according to the present invention. Upon consideration of the remainder of this discussion, it will become apparent that the present invention can be implemented using a single illumination source and detector, or multiple illumination sources and/or detectors.

Scanning array 224 may be a linear array of photosensitive sensors such as charge coupled devices, photo-diodes and the like, which operate to sense light reflected from or transmitted through a document during the illumination period. The photosensitive sensors produce an electrical signal indicative of the intensity of light sensed. This electrical signal may be output for use by CPU 105 in assimilating an electronically stored representation of image 222, or measurement of an attribute of image 222 such as image density. Scanning array 224 generally extends in a direction transverse to that of the motion of scanning system assembly 250. This enables scanning system assembly 250 to move along an axis known to those skilled in the art as the "slow scan" axis, which begins at one end of image 222 and extends in the process direction towards the opposite end. The direction across the page in which the array extends is known as the fast scan axis. It will be appreciated that movement of scanning system assembly 250 is described relative to a document being scanned, and that the document may be moved rather than the scanning assembly.

A method according to the present invention may be implemented by making multiple measurements during a single scan, or by performing multiple scans to record separate measurements. For example, illumination source 234a and lamp 234 may illuminate image 222 with different frequencies of light during the same scan pass. In such a case, array 224 would preferably be configured to produce signals from each of the different light frequencies such that two separate images are recorded. Alternatively, separate reflected-light frequencies from the same source could be used to record multiple images during the same pass.

Different light frequencies need not be used in practicing the present invention. In another embodiment, detectors are placed to receive both reflected and transmitted light, and images corresponding to the reflected and transmitted light are recorded. The present invention may also be practiced by varying the intensity of a light source, providing a "delay path" so that either reflected or transmitted light reaches a detector at different times, varying the number and placement of illumination sources and detectors, and/or performing multiple scans.

Figure 3:
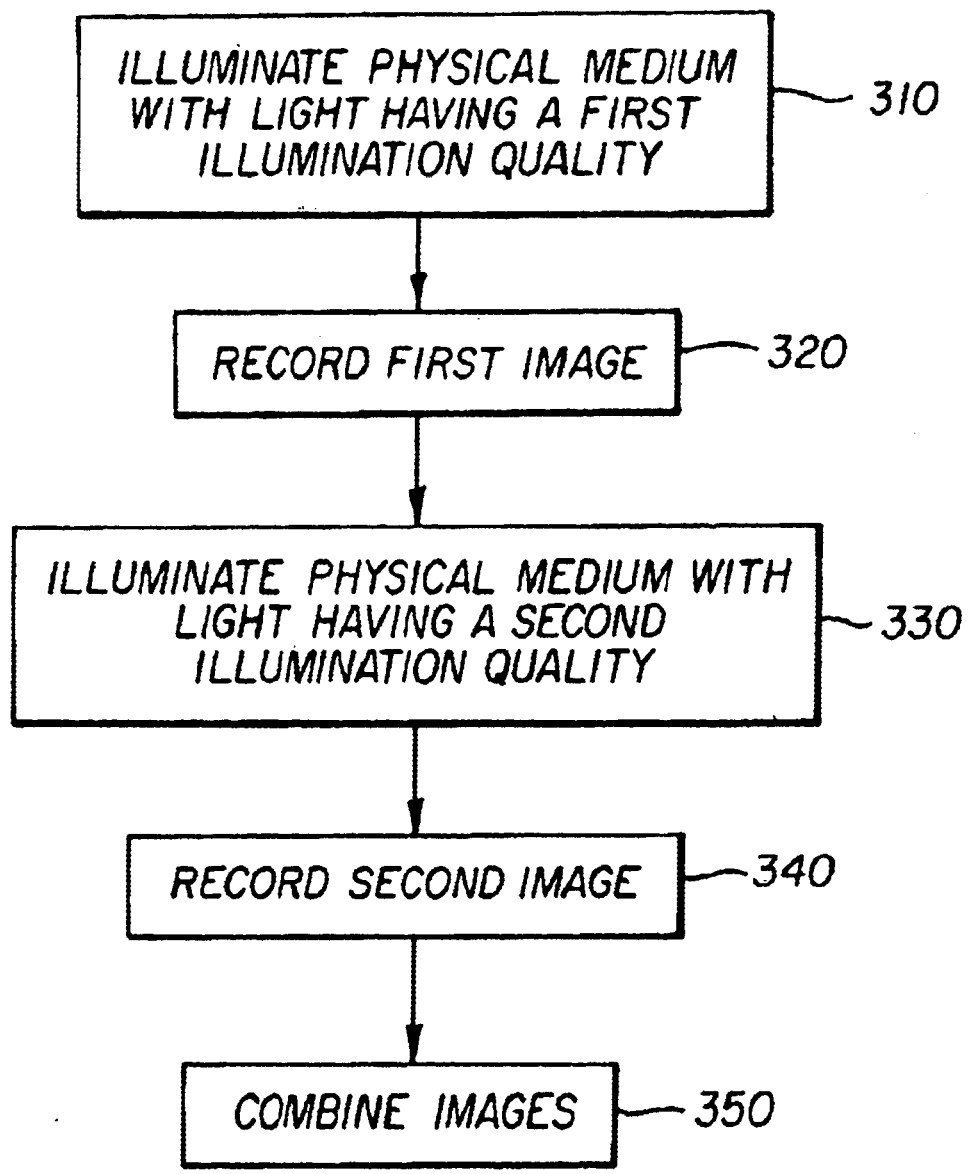
FIG. 3 is a flow chart illustrating a method according to a preferred embodiment of the present invention.

Referring next to FIG. 3, a flowchart illustrating a preferred method of practicing the present invention is shown. The method begins at step 310, where a physical medium is illuminated using light having a first illumination quality. Step 320 records a first image of the physical medium as it is being illuminated by the light having the first illumination quality. Steps 330 and 340 are analogous to steps 310 and 320, except that a light having a second illumination quality, preferably different from the first illumination quality, is used. The method concludes with step 350, in which the images recorded in steps 320 and 340 are combined. It should be noted that while FIG. 3 illustrates a particular sequence of steps, methods of practicing the present invention using variations in the order of the illustrated steps can be employed.

Figure 4:
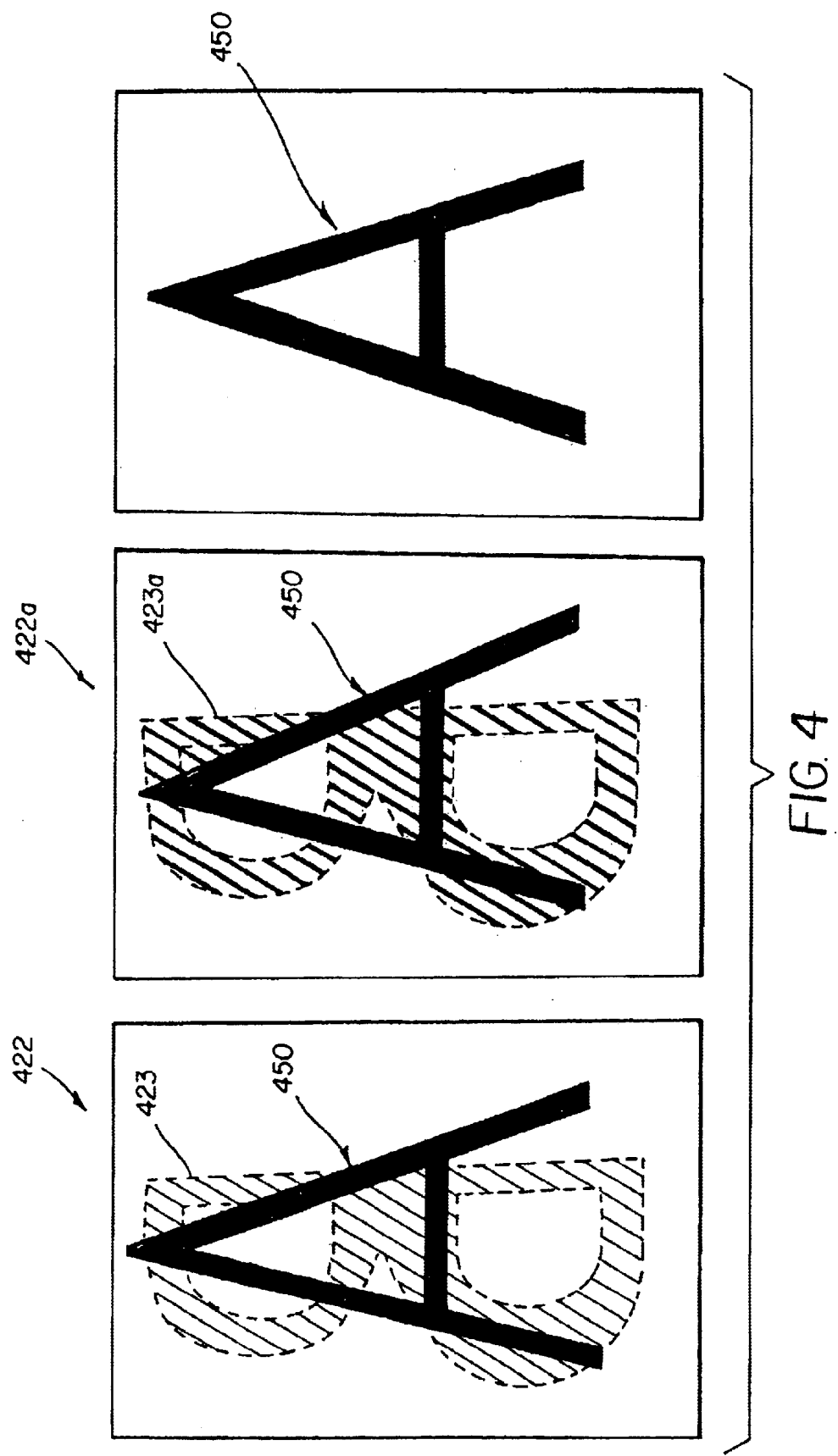
FIG. 4 illustrates an image on the back of a document bleeding-through into an image on the front of the document.

The method just discussed may be more clearly understood by referring next to FIG. 4, which shows two recorded images 422 and 422a, and a desired image 450. First recorded image 422 and second recorded image 422a illustrate bleed-through, wherein bleed-through images 423 and 423a respectively, can be seen through a medium having desired image 450 thereon. Bleed-through images 423 and 423a interfere with the recording and/or reproduction of desired image 450.

One method of reducing the undesirable effects of bleed-through employs a first image 422 captured using reflected light, and a second image 422a acquired using transmitted light. By making use of the fact that the density of bleed-through image 423 is different from the density of bleed-through image 423a, various filtering algorithms may be used to reduce or remove the undesired bleed-through from a final captured image. For example, bleed-through image 423, recorded using reflected light, will appear less dense than bleed-through image 423a, which is recorded using transmitted light. Desired image 450 will have approximately the same measured density regardless of whether reflected or transmitted light is used. Using these facts, images 422 and 422a may be combined in such a way that any differences between them are assumed to be due to bleed-through, and subtracted out.

Another embodiment of the present invention uses a variation of thresholding to reduce bleed-through recorded in a captured image. Recall that bleed-through images 423 and 423a have different densities, and that desired image 450 has a generally constant measured density. By using this relatively constant measured density as a threshold value, any measured density less than that of desired image 450 can be assumed to be an effect of bleed-through.

After the measured image density of each portion of the recorded image is compared to the threshold value established by the measured image density of desired image 450, the electronic value of any portion of image 422 or 422a that has been determined to be bleed-through, is set to indicate a zero density (white) area. In effect, any part of the image that is deemed not dense enough to be part of desired image 450, is removed by making the bleed-through image the same color as the background. Those skilled in the art will appreciate that other image combination methods may be employed without departing from the spirit and scope of the present invention, including other variations of thresholding, summation, and difference techniques.

Still referring to FIG. 4, it should be noted that the present invention may form both first image 422 and second image 422a with reflected light. By varying the intensity of an illumination source, a difference in the amount of bleed-through present in the two images 422 and 422a will be detected. A combination of these images consistent with that described in the preceding paragraph will likewise result in a reduction of bleed-through.

Images 422 and 422a may be captured using a single scan with multiple illumination sources, or in multiple scans using a single illumination source. The present invention can be implemented using a single light source in a single scan, by providing optical guides (mirrors, fiber optic lines, etc.) configured to illuminate various portions of an image at one time. However, the emission point of each of these guides would be considered, for purposes of this disclosure, an illumination source.

As discussed earlier, the method of the present invention obtains multiple representations of a physical image, and combines these representations into a captured image having reduced bleed-through. This captured image is preferably an electronic representation of the physical image, and is stored as a digital file embodied in a computer readable medium. The captured image contained in the digital file can then be extracted from the computer readable medium and reproduced using a suitable image output device.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 115 of one or more computer or information handling systems 190 configured generally as described in FIGS. 1–4. Until required by the computer system, the set of instructions may be stored in another computer readable memory, for example, in a hard disk drive or in a removable memory such as an optical disk for eventual use in a CDROM drive or a floppy disk for eventual use in a floppy disk drive. Further, the set of instructions can be stored in the memory of another computer and transmitted over a local area network or a wide area network, such as the Internet, where the transmitted signal could be a signal propagated through a medium such as an ISDN line, or the signal may be propagated through an air medium and received by a local satellite whereupon being transferred to the computer or system of the preferred embodiment where the signal is a composite signal comprising a carrier signal, and contained within the carrier signal is the desired information containing at least one computer program instruction implementing the invention and may be downloaded as such when desired by the user. One skilled in the art would appreciate that the physical storage and/or transfer of the sets of instructions physically changes the medium upon which it is stored electrically, magnetically, or chemically so that the medium carries computer readable information. The invention is limited only by the following claims and their equivalents.

What is claimed is:

1. A method for reducing the effect of bleed-through on a captured image comprising:
    illuminating a physical medium with light having a first illumination quality;
    recording a first image of the physical medium, wherein the first image of the physical medium is recorded using light reflected from the physical medium;
    illuminating the physical medium with light having a second illumination quality;
    recording a second image of the physical medium, wherein the second image of the physical medium is recorded using light transmitted through the physical medium; and
    combining the first image and the second image to form a captured image, wherein a difference between said first and second images represent a bleed-through of at least one of an image, text and a mark on a first side of said medium to a second side of said medium which is subtracted out to reduce the bleed-through.

2. The method as in claim 1, wherein a single illumination source provides said light having a first illumination quality and said light having a second illumination quality.

3. The method as in claim 1, wherein a first illumination source provides said light having a first illumination quality and a second illumination source provides said light having a second illumination quality.

4. The method as in claim 1, wherein the first illumination quality is a first illumination intensity, and the second illumination quality is a second illumination intensity.

5. The method as in claim 1, wherein the first illumination quality is a first frequency of light, and the second illumination quality is a second frequency of light.

6. A digital file tangibly embodied in a computer readable medium, said digital file generated by implementing a method comprising:
    illuminating a physical medium with light having a first illumination quality;
    recording a first image of the physical medium;
    illuminating the physical medium with light having a second illumination quality;
    recording a second image of the physical medium; and
    combining the first and the second image to form a captured image, wherein a difference between said first and second images represent a bleed-through of at lest one of an image, text and a mark on a first side of said medium to a second side of said medium which is subtracted out to reduce the bleed-through;
    wherein the first image of the physical medium is recorded using light reflected from the physical medium, and the second image of the physical medium is recorded using light transmitted through the physical medium.

7. The digital file as in claim 6, wherein the first illumination quality is a first illumination intensity, and the second illumination quality is a second illumination intensity.

8. An image-capturing system comprising:
    at least one illumination source, said at least one illumination source capable of illuminating said physical medium such that light is reflected from said physical medium and transmitted through said physical medium;
    at least one detector, said detector enabled to generate signals in response to said light reflected from said physical medium and said light transmitted through said physical medium, and said detector further enabled to output said signals for image processing; and
    an information handling system, said information handling system comprising:
    at least one processor;
    memory operably associated with said processor; and
    a program of instructions capable of being stored in said memory and executed by said processor, said program of instructions enabled to control illumination of the physical medium, receive said electrical signals output by said at least one detector, and process said electrical signals to form a captured image having reduced bleed-through.

9. The image-capturing system as in claim 8, further comprising a plurality of illumination sources, wherein a first illumination source is enabled to provide said light reflected from said physical medium, and a second illumination source is enabled to provide said light transmitted through said medium.

10. The image-capturing system as in claim 9, wherein said first illumination source is configured to illuminate a first side of the physical medium, and said second illumination source is configured to illuminate a second side of the physical medium.

11. The image-capturing system as in claim 9, wherein said first illumination source provides a first illumination intensity, and said second illumination source provides a second illumination intensity.

12. The image-capturing system as in claim 9, wherein said first illumination source provides a first frequency of light and said second illumination source provides a second frequency of light.

13. The image-capturing system as in claim 8, wherein said at least one illumination source is configured to illuminate said physical medium a plurality of times.

14. The image-capturing system as in claim 13, wherein said at least one illumination source illuminates said physical medium a first time with light having a first illumination intensity and at least a second time with light having an illumination intensity different from said first illumination intensity.

15. The image-capturing system as in claim 13, wherein said at least one illumination source illuminates said physical medium a first time with light having a first frequency and at least a second time with light having a frequency different from said first frequency.

16. The image-capturing system as in claim 8, wherein said image capturing system comprises a facsimile device.

17. The image-capturing system as in claim 8, wherein said image capturing system comprises a copy machine.

18. The image-capturing system as in claim 8, wherein said image capturing system comprises a scanner.

19. A method for correcting bleed-through in a captured image comprising:
    obtaining information indicative of a first image density of an image formed on a physical medium;
    obtaining information indicative of a second image density of the image formed on the physical medium;

comparing the information indicative of the first image density with the information indicative of the second image density to determine what portions of the information are due to bleed-through; and altering the portions of the information that are due to bleed-through to form a corrected image.

20. The method as in claim 19, wherein the information indicative of a first image density is obtained using reflected light and the information indicative of the second image density is obtained using transmitted light.

21. The method as in claim 19, wherein the information indicative of a first image density and the information indicative of a second image density are obtained using reflected light.

22. The method as in claim 19, wherein the information indicative of a first image density is obtained using light having a first frequency, and the information indicative of the second image density is obtained using light having a second frequency different from the first frequency.

* * * * *